(12) United States Patent
Bohizic et al.

(10) Patent No.: US 7,899,663 B2
(45) Date of Patent: Mar. 1, 2011

(54) PROVIDING MEMORY CONSISTENCY IN AN EMULATED PROCESSING ENVIRONMENT

(75) Inventors: Theodore J. Bohizic, Hyde Park, NY (US); Mark H. Decker, Rhinebeck, NY (US); Viktor S. Gyuris, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 11/694,082

(22) Filed: Mar. 30, 2007

(65) Prior Publication Data

US 2008/0243468 A1    Oct. 2, 2008

(51) Int. Cl.
G06F 9/445 (2006.01)
G06F 13/00 (2006.01)
G06F 15/167 (2006.01)

(52) U.S. Cl. .......................... 703/26; 710/31; 710/200; 710/260; 709/210; 709/213; 712/28; 712/244; 711/100; 711/130; 711/147

(58) Field of Classification Search .................. 703/26; 710/31, 200, 260; 709/210, 213; 712/28, 712/244; 711/100, 130, 147
See application file for complete search history.

(56) References Cited

U.S. PATENT DOCUMENTS

| | | | | |
|---|---|---|---|---|
| 5,778,221 A * | 7/1998 | Temple | ........................ | 712/244 |
| 5,790,851 A * | 8/1998 | Frank et al. | .................. | 718/104 |
| 6,075,938 A * | 6/2000 | Bugnion et al. | ............... | 703/27 |
| 6,304,924 B1 * | 10/2001 | Varma | ......................... | 710/52 |
| 6,611,900 B2 * | 8/2003 | Patel et al. | .................... | 711/145 |
| 6,615,281 B1 * | 9/2003 | Temple, III | .................. | 713/375 |
| 6,615,340 B1 * | 9/2003 | Wilmot, II | .................. | 712/209 |
| 6,965,905 B2 * | 11/2005 | Garthwaite | ........................ | 1/1 |
| 7,197,585 B2 * | 3/2007 | Farrell et al. | ................. | 710/200 |
| 7,213,248 B2 * | 5/2007 | Arimilli et al. | .............. | 718/104 |
| 7,529,914 B2 * | 5/2009 | Saha et al. | ................... | 712/220 |
| 7,747,996 B1 * | 6/2010 | Dice | .......................... | 717/169 |
| 2002/0046334 A1 * | 4/2002 | Wah Chan et al. | ........... | 712/223 |
| 2002/0083149 A1 * | 6/2002 | Van Huben et al. | .......... | 709/215 |
| 2002/0194436 A1 * | 12/2002 | McKenney | ................... | 711/152 |
| 2003/0018841 A1 * | 1/2003 | Lesartre | ...................... | 710/200 |
| 2003/0037178 A1 * | 2/2003 | Vessey et al. | ................ | 709/319 |

(Continued)

FOREIGN PATENT DOCUMENTS

GB    2132797    7/1984

(Continued)

OTHER PUBLICATIONS z/Architecture—Principles of Operation, Fifth Edition (Sep. 2005), SA22-7832-04, pp. 3-47-3-53.

(Continued)

*Primary Examiner*—Kamini S Shah
*Assistant Examiner*—Kibrom Gebresilassie
(74) *Attorney, Agent, or Firm*—John E. Campbell; Blanche E. Schiller, Esq.; Heslin Rothenberg Farley & Mesiti P.C.

(57) ABSTRACT

Memory consistency is provided in an emulated processing environment. A processor architected with a weak memory consistency emulates an architecture having a firm memory consistency. This memory consistency is provided without requiring serialization instructions or special hardware.

19 Claims, 8 Drawing Sheets

U.S. PATENT DOCUMENTS

| | | | |
|---|---|---|---|
| 2003/0093649 A1 | 5/2003 | Hilton | 712/41 |
| 2003/0115476 A1* | 6/2003 | McKee | 713/193 |
| 2004/0078186 A1 | 4/2004 | Nair et al. | |
| 2005/0262301 A1* | 11/2005 | Jacobson et al. | 711/118 |
| 2006/0047856 A1 | 3/2006 | Tripathi | |
| 2006/0095793 A1 | 5/2006 | Hall | |
| 2006/0248284 A1* | 11/2006 | Petev | 711/141 |
| 2006/0265704 A1* | 11/2006 | Holt | 717/169 |
| 2008/0147213 A1* | 6/2008 | Omiya et al. | 700/94 |
| 2008/0215830 A1 | 9/2008 | Bohizic et al. | |

FOREIGN PATENT DOCUMENTS

| | | | |
|---|---|---|---|
| WO | WO9829805 A1 | 7/1998 | |
| WO | WO0116738 A2 | 3/2001 | |

OTHER PUBLICATIONS

ESA/390 Interpretive-Execution Architecture, Foundation for VM/ESA, D. Osisek, et al., IBM Systems Journal, vol. 30, No. 1, 1991, pp. 34-51.

A Simulation Based Study of TLB Performance, 8345 Computer Architecture News, May 20, 1992, No. 2, New York, US, pp. 114-123.

z/Architecture—Principles of Operation, Fifth Edition (Sep. 2005), SA22-7832-04, pp. 3-31-3-52; 4-22-4-35.

Smith, James & Ravi Nair, "Virtual Machines—Versatile Platforms for Systems and Processes," Morgan Kaufmann Publishers, 2005, pp. 27-82, 114-133, 304-320.

Notification of Transmittal of the International Search Report and the Written Opimion of the International Searching Authority, or the Declaration for PCT/EP2008-053039.

"Memory Coherence in Shared Virtual Memory Systems," Kai Li and Paul Hudak, Proc. 5th Ann. ACM Symposium on Distributed Computing (Aug. 1986), pp. 229-239.

* cited by examiner fig. 1 fig. 2 fig. 3 fig. 4A fig. 4B fig. 4C fig. 5 fig. 6 fig. 7 fig. 8 fig. 9

PROVIDING MEMORY CONSISTENCY IN AN EMULATED PROCESSING ENVIRONMENT

TECHNICAL FIELD

This invention relates, in general, to an emulated processing environment, and in particular, to emulating an architecture having a firm memory consistency on a processor having a weak memory consistency, such that memory accesses adhere to the firm memory consistency architecture.

BACKGROUND OF THE INVENTION

During processing, it is imperative that a consistent view of the memory be provided to the processors accessing that memory. In environments that are architected with a weak memory consistency, specific steps must be taken to ensure memory consistency. For instance, in weak memory consistency environments, the order of updates of a particular unit of memory is not guaranteed, as observed by other processors. Thus, software running on a weak memory consistency environment must tolerate the ambiguity or use instructions to explicitly force the consistency. That is, each time a memory store is executed, synchronization is performed before another memory access is allowed. The use of instructions to force consistency, however, seriously degrades system performance.

In contrast to a weak memory consistent environment, some environments are architected with a firm memory consistency. In such environments, hardware is provided to maintain the consistency of the memory.

SUMMARY OF THE INVENTION

Although hardware offers advantages over the use of instructions to force consistency, hardware is not always available to perform such functions. For instance, when a processor having a weak memory consistent model is to emulate a firm memory consistent model, there is no hardware to provide the consistency. In such situations, a need exists for a capability to efficiently provide memory consistency.

For example, a need exists for a capability that reduces overhead in providing firm memory consistency in a weak memory consistency environment. In one particular aspect, a need exists for a capability that enables a processor having a weak memory consistency to efficiently emulate a processor having a firm memory consistency, such that memory consistent memory accesses are efficiently provided.

The shortcomings of the prior art are overcome and additional advantages are provided through the provision of an article of manufacture that includes at least one computer usable medium having computer readable program code logic to manage memory access in an emulated processing environment. The computer readable program code logic when executing performing, for instance, the following: requesting, by an emulated central processing unit (CPU) process executing on a processor having a weak memory consistency architecture, access to a unit of memory as part of a unit of operation; and managing, by the emulated CPU process, access to the unit of memory, wherein the managing forces a firm memory consistency, in which other emulated CPU processes cannot observe the unit of memory if it is being modified, and wherein the managing includes at least one of: employing one or more memory access tests to determine if the unit of the memory is accessible, the one or more memory access tests including tests added to an existing architected access control block that includes an indication of which emulated CPU processes, if any, have read or write access to the unit of memory, and obtaining access to the requested unit of memory, in response to the employing indicating availability of the unit of memory; determining that the unit of memory is being held by another emulated CPU process and is inaccessible to the emulated CPU process at this time, and invoking an interrupt handler to request that the another emulated CPU process relinquish one or more rights held for the unit of memory to allow the emulated CPU process to obtain access to the unit of memory; and determining whether another emulated CPU process is requesting access to a unit of memory held by the requesting emulated CPU process, and nullifying the unit of operation, in response to the determining indicating that the another emulated CPU process is requesting access, said nullifying avoiding a deadlock.

Methods and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, memory consistency is provided in an emulated processing environment. A processor having a weak memory consistency emulates an architecture having a firm memory consistency, and memory consistency is provided without requiring serialization instructions or special hardware to perform this function. Further, deadlock situations are avoided.

Figure 1:
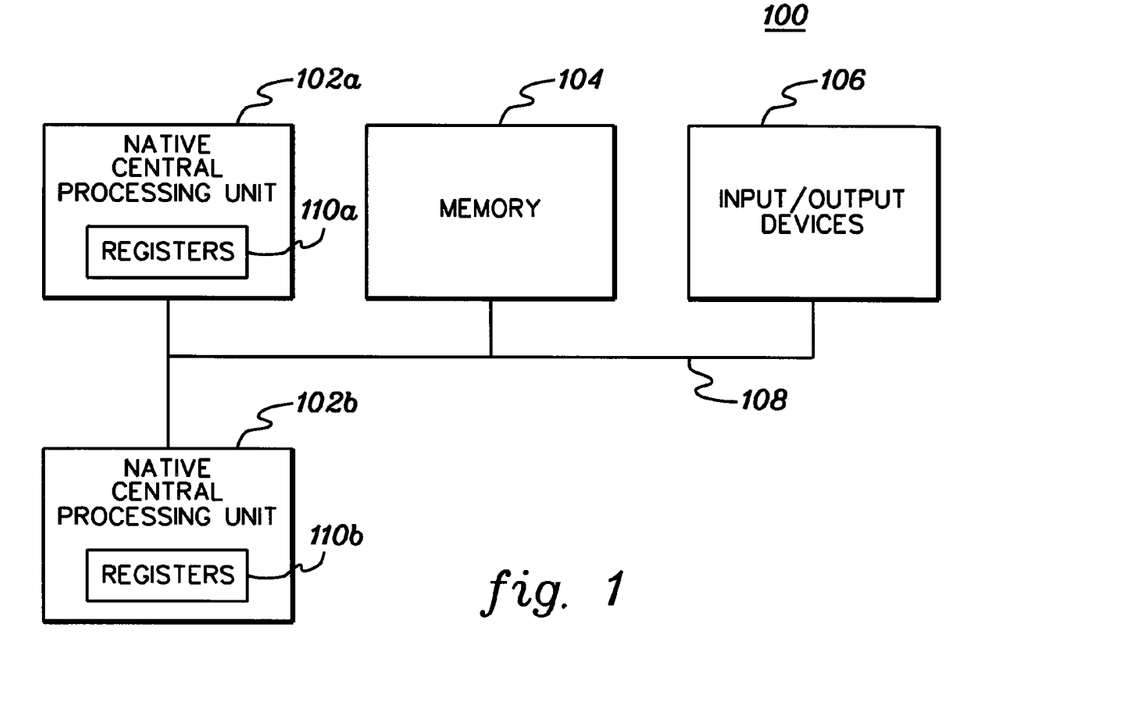
FIG. 1 depicts one embodiment of a processing environment to incorporate and use one or more aspects of the present invention.

One embodiment of a processing environment to incorporate and use one or more aspects of the present invention is described with reference to FIG. 1. Processing environment 100 includes, for instance, a plurality of native processors 102 (e.g., central processing unit (CPU) 102a, 102b), a memory 104 (e.g., main memory) shared by the plurality of processors (collectively referred to as processors 102) and one or more input/output (I/O) devices 106 accessible to the plurality of processors. The processors, memory and I/O devices are coupled to one another via, for example, one or more buses 108.

In this example, each processor is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety. As examples, processor 102 is a part of a pSeries® server offered by International Business Machines Corporation (IBM®), Armonk, N.Y. IBM®, pSeries® Power PC®, and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Each native central processing unit 102 includes one or more native registers 110 (e.g., 110a, 110b, collectively referred to as native registers 110), such as one or more general purpose registers and/or one or more special purpose registers, used during processing within the environment. These registers include information that represent the state of the environment at any particular point in time.

To provide emulation, the processing environment is architected to include at least one emulator, at least one guest operating system and one or more guest applications. In particular, one or more of the processors can provide emulation, host a guest operating system and execute one or more guest applications. These features are further described with reference to FIG. 2.

Figure 2:
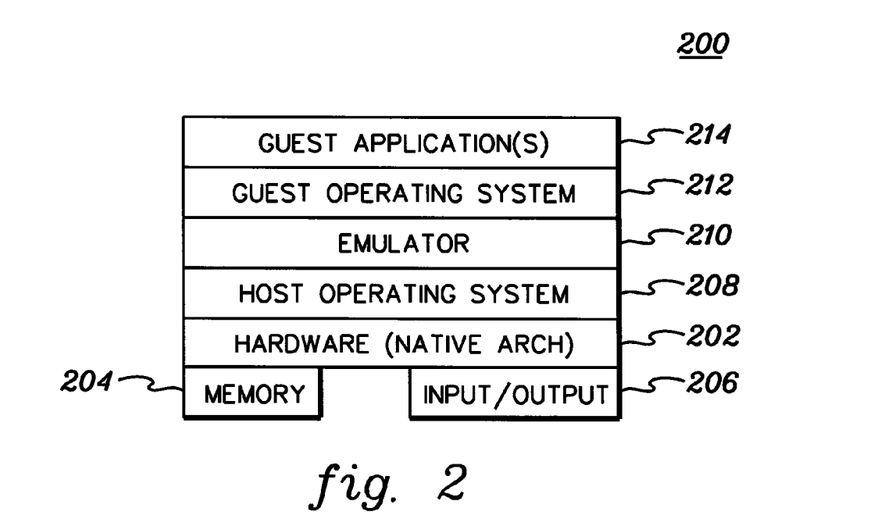
FIG. 2 depicts one embodiment of a system architecture of the processing environment of FIG. 1, in accordance with an aspect of the present invention.

Referring to FIG. 2, one embodiment of a system architecture 200 of processing environment 100 is described. System architecture 200 includes, for instance, a plurality of implementation layers, which define the architected aspects of the environment. In this particular example, the layers include hardware 202, which is coupled to memory 204 and input/output devices and/or networks 206 via one or more interfaces and/or controllers. In this example, each processor 102a, 102b includes hardware layer 202, but memory 204 and I/O devices 206 are shared, as depicted in FIG. 1.

Returning to FIG. 2, architecture 200 further includes a host operating system 208; an emulator 210; a guest operating system 212; and one or more guest applications 214; as examples. One layer is coupled to at least one other layer via one or more interfaces. For instance, guest applications 214 are coupled to guest operating system 212 via at least one interface. Other interfaces are used to couple the other layers. Moreover, the architecture can also include other layers and/or interfaces. Again, each processor may have a host operating system and provide emulation. Each processor may host a guest operating system and one or more guest applications. Various of the layers depicted in FIG. 2 are further described below.

Hardware 200 is the native architecture of the processing environment and is based on, for instance, Power4, PowerPC®, Intel®, or other architectures. Running on the hardware is a host operating system 208, such as AIX® offered by International Business Machines Corporation, or LINUX. AIX® is a registered trademark of International Business Machines Corporation, Armonk, N.Y.

Emulator 210 includes a number of components used to emulate an architecture that differs from the native architecture. In this embodiment, the architecture being emulated is the z/Architecture® offered by International Business Machines Corporation, but other architectures may be emulated as well. The emulation enables a guest operating system 212 (e.g., z/OS®, a registered trademark of International Business Machines Corporation) to execute on the native architecture and enables the support of one or more guest applications 214 (e.g., Z applications). Further details regarding emulator 210 are described with reference to FIG. 3.

Figure 3:
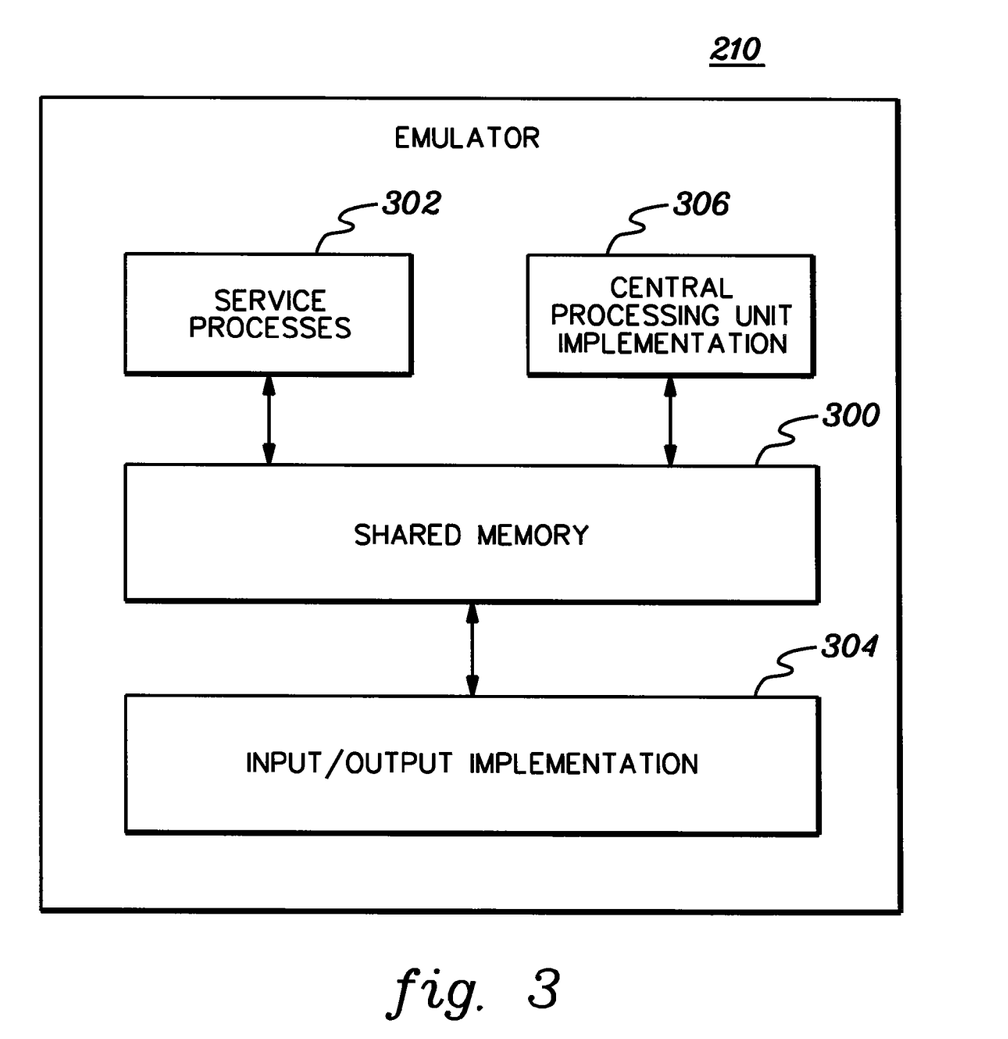
FIG. 3 depicts further details of one embodiment of an emulator of the system architecture of FIG. 2, in accordance with an aspect of the present invention.

Referring to FIG. 3, emulator 210 includes a shared memory 300 coupled to one or more service processes 302, an input/output (I/O) implementation 304, and a central processing unit (CPU) implementation 306, each of which is described in further detail below.

Shared memory 300 is a representation of a portion of memory in the host that is visible from service processes 302, I/O implementation 304, and CPU implementation 306. It is a storage area in which the independent processes (e.g., service processes, I/O implementation, CPU implementation) communicate by reading and storing data into the shared memory. As one example, the shared memory includes a plurality of regions including, for instance, system global information, CPU contexts and information, emulated main storage, emulated main storage keys, and subchannels (i.e., data structures that represent I/O devices).

Service processes 302 include one or more processes used to create the CPUs and one or more other processes, as well as provide architected operator facilities, such as start, stop, reset, initial program load (IPL), etc. It may also provide other functions, such as displays or alteration of emulated system facilities, obtaining/freeing shared resources, other maintenance commands, etc.

Input/output implementation 304 includes, for instance, one or more subchannel processes and an I/O controller used to communicate with I/O devices. The I/O controller is responsible for starting the subchannel processes and performing recovery, in one aspect of the present invention.

Central processing unit (CPU) implementation 306 includes one or more emulated CPU processes, and is responsible for executing instructions and managing the processing. It includes a number of components, which are described with reference to FIGS. 4A-4B.

Figure 4A:
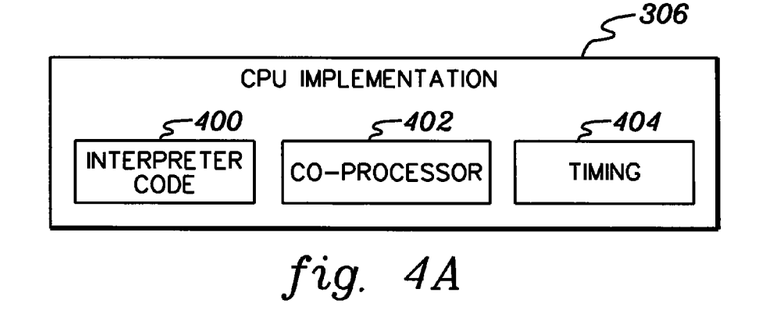
FIG. 4A depicts further details of one embodiment of a central processing unit (CPU) implementation of the emulator of FIG. 3, in accordance with an aspect of the present invention.

Referring to FIG. 4A, CPU implementation 306 includes, for instance, interpreter code 400 used to obtain, translate and execute instructions; an architectured co-processor 402 that aids in initial start-up and communication with the chip (e.g., Service Call Logical Processor (SCLP) processes); and timing facilities 404 that are responsible for timing functions of the emulator. Further details regarding interpreter code 400 are described with reference to FIG. 4B.

Figure 4B:
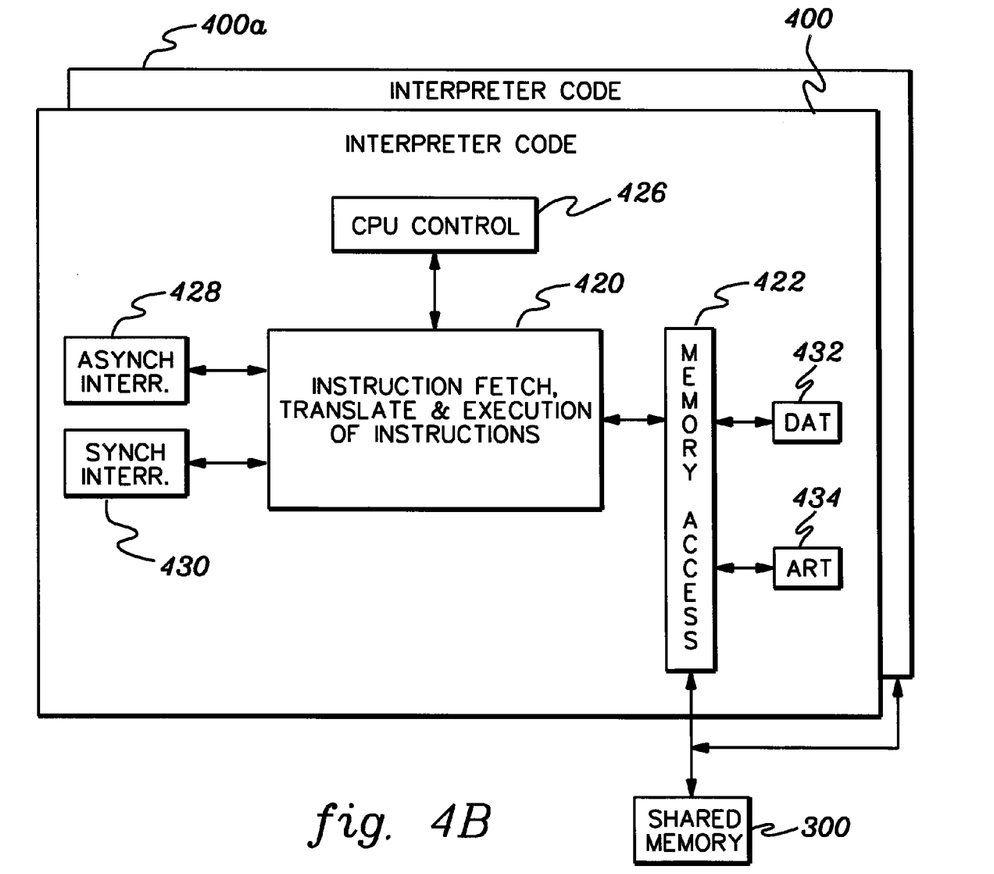
FIG. 4B depicts further details of one embodiment of interpreter code of the CPU implementation of FIG. 4A, in accordance with an aspect of the present invention.

Interpreter code 400 includes, for instance, an interpretation unit 420 coupled to a memory access unit 422, a CPU control 426, an asynchronous interruption handler 428 and a synchronous interruption handler 430. In this example, each processor includes interpreter code, and thus, an interpreter code 400a is represented. Additional processors may or may not have interpreter code 400.

Interpretation unit 420 is responsible for obtaining one or more guest instructions from memory, providing native instructions for the guest instructions, and executing the native instructions. The guest instructions comprise software instructions (e.g., machine instructions) that were developed to be executed in an architecture other than that of native CPU 102. For example, the guest instructions may have been designed to execute on a z/Architecture® processor, but are instead being emulated on native CPU 102, which may be, for instance, a pSeries® server.

In one example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

In a further example, the providing includes creating during, for instance, a translation process, a native stream of instructions for a given set of guest instructions. This includes identifying the functions and creating the equivalent native instructions.

If an instruction includes a memory access, then memory access routines 422 are used to access shared memory 300. The memory access routines may use translation mechanisms, such as dynamic address translation (DAT) 432 or access register translation (ART) 434, to translate a logical address to an absolute address, which is then used to access the memory or may be further translated, if needed.

In this embodiment, the processing within interpretation unit 420 is to be streamlined. Thus, if a more complicated circumstance arises, such as a wait state, or changing from one architecture level to another architecture level (e.g., z/Architecture® to ESA/390, etc.), control is transferred to CPU control 426, which handles the event and then returns control to interpretation unit 420.

Moreover, if an interrupt occurs, then processing transitions from interpretation unit 420 to either asynchronous interruption handler 428, if it is an asynchronous interruption, or synchronous interruption handler 430, if it is a synchronous interruption. After the interrupt is handled, processing returns to interpretation unit 420.

In particular, the interpretation unit monitors certain locations in shared memory and if a location has changed, it signifies an interrupt has been set by one of the CPUs or I/O. Thus, the interpretation unit calls the appropriate interruption handler.

In accordance with an aspect of the present invention, accesses to memory are managed, as if the processing environment was architected based on a firm consistency model. In particular, a processor architected based on a weak consistency model provides access to memory as if the processor was architected based on a firm consistency model. The weak memory consistent system emulates the firm memory consistent system and this emulation includes providing memory access in an efficient manner that provides memory consistency without requiring instruction synchronization or hardware to provide the consistency, and which avoids deadlocks.

In one example, firm memory consistency is forced using a locking mechanism and existing architected features of the z/Architecture®, which have been enhanced for one or more aspects of the present invention. An overview of the locking mechanism is described with reference to FIG. 4C.

Figure 4C:
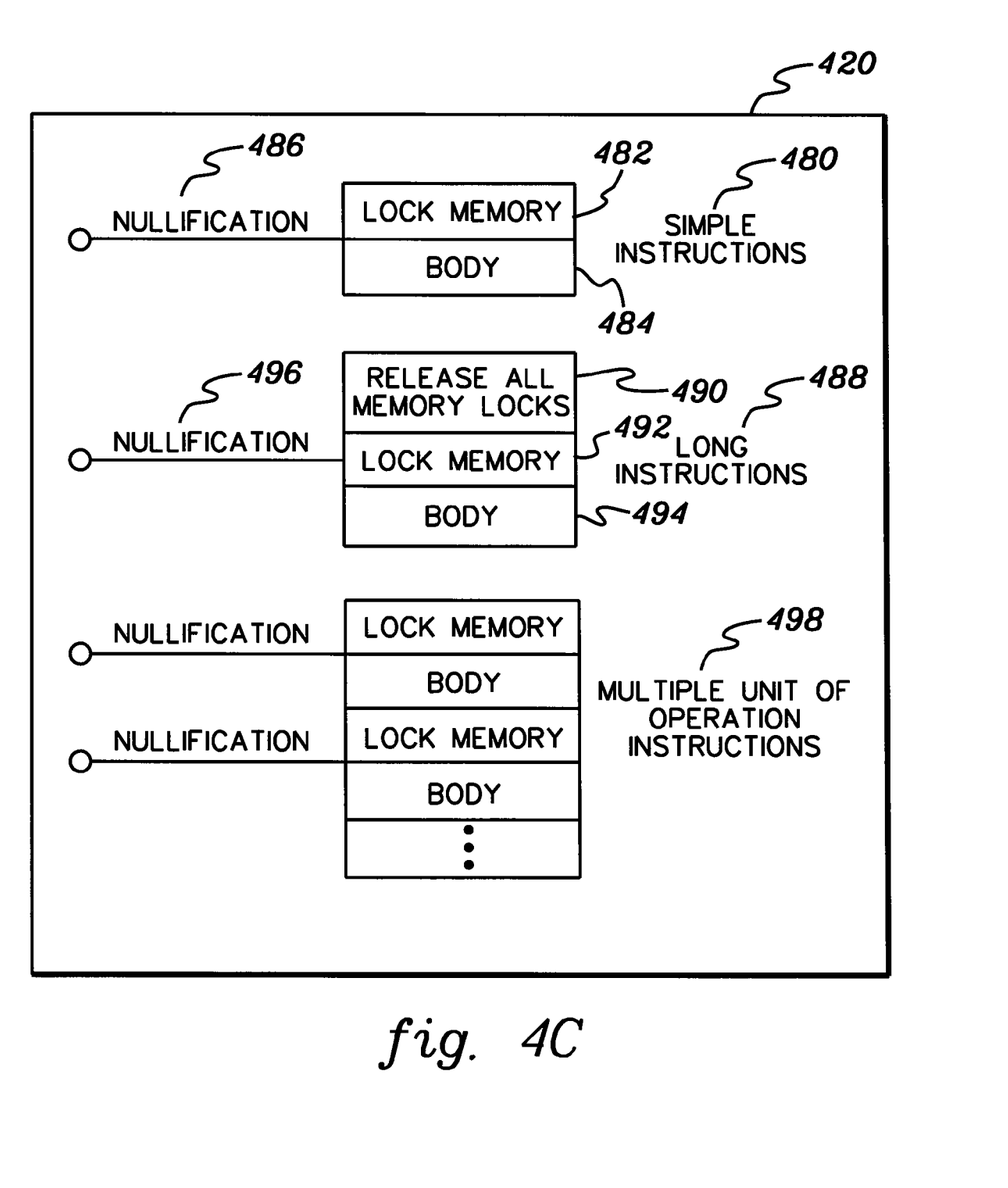
FIG. 4C depicts further details of one embodiment of an interpretation unit of the interpreter code of FIG. 4B, in accordance with an aspect of the present invention.

Specifically, FIG. 4C provides additional details relating to interpretation unit 420, and in particular, to the types of instructions executed by unit 420 that utilize the locking mechanism. As an example, one type of instruction is a simple instruction 480 that includes one unit of operation. With such an instruction, a unit of memory requested by the instruction is locked 482, and then if the locking is successful, the body of the instruction is executed 484. If during the locking, another processor requests a unit of memory locked by this processor performing the locking, then nullification 486 is performed to avoid deadlocks, as described below.

Another type of instruction is a long running instruction 488. This type of instruction includes code to release locks 490 held by this processor and then to re-lock 492 only those locks that are needed. This is a service to other CPUs. After successfully obtaining the locks, the body of the instruction is executed 494. Again, if during the locking, another processor requests a unit of memory held by this processor, nullification 496 is performed.

Another type of instruction is a multiple unit of operation instruction 498, which is comprised of multiple simple instructions, each treated like such.

Figure 5:
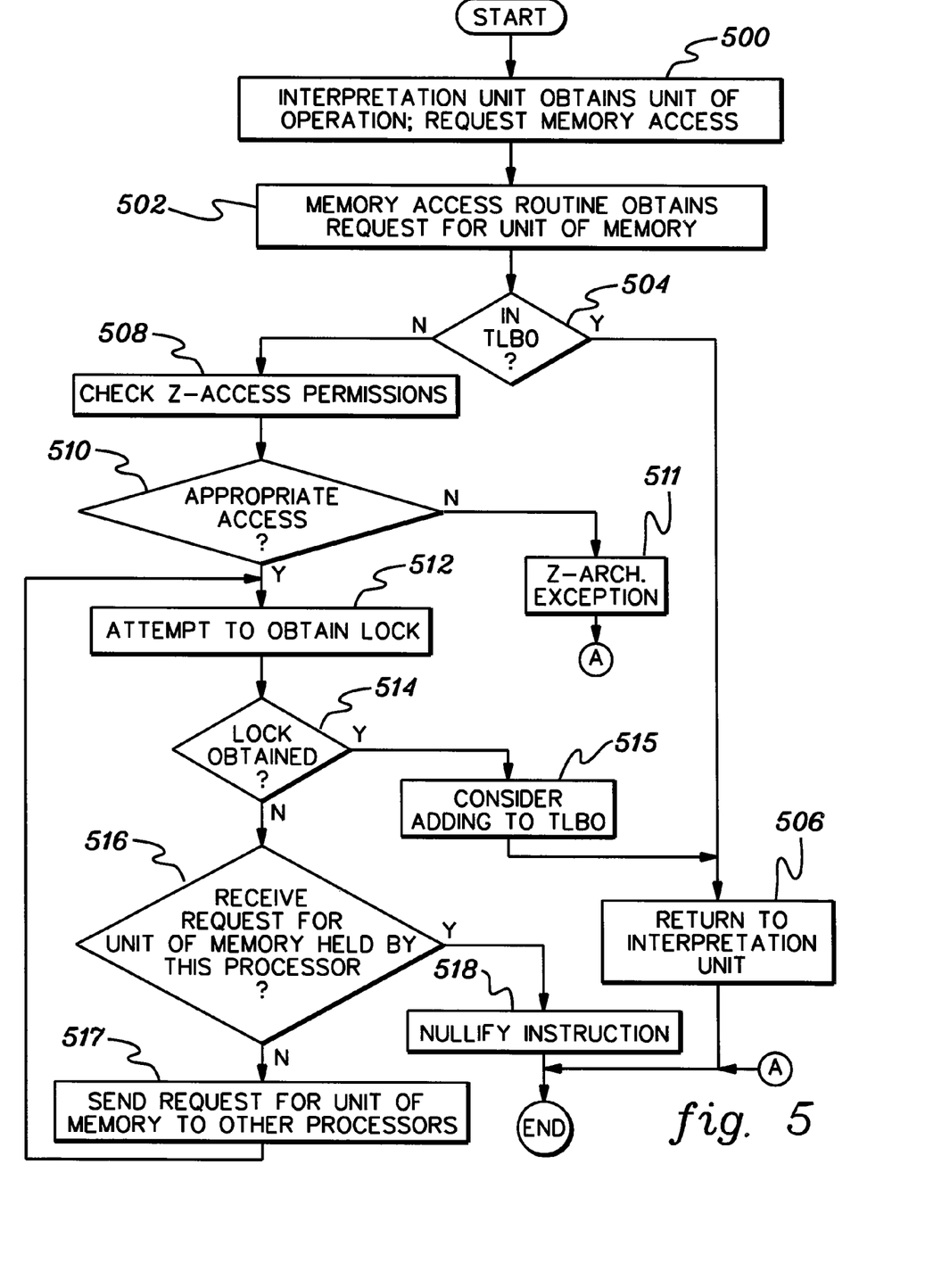
FIG. 5 depicts one embodiment of the logic associated with obtaining access to a unit of memory, in accordance with an aspect of the present invention.

Further details regarding locking and employing the existing, but enhanced, architected features to force firm memory consistency are described with reference to FIG. 5. FIG. 5 depicts one embodiment of the logic associated with providing memory access.

Referring to FIG. 5, initially, an interpretation unit (e.g., interpretation unit 420) obtains (e.g., fetches, receives, is provided, etc.) a unit of operation, which includes a request for memory access, STEP 500. The request may be for read or write access of a memory unit.

The interpretation unit forwards this request to a memory access routine, STEP 502. The memory access routine determines, in one example, whether the requested unit of memory is readily accessible. For instance, a determination is made as to whether the requested unit of memory is represented in a buffer, referred to as translation lookaside buffer 0 (TLB0), INQUIRY 504. TLB0 includes designations (e.g., addresses) of units of memory that have already been address translated, if need be, and accesses to that unit of memory do not need monitoring. That is, TLB0 includes designations of units of memory that are readily accessible. Further details regarding TLB0 are described in U.S. Ser. No. 11/680,703 entitled "Employing A Data Structure Of Readily Accessible Units Of Memory To Facilitate Memory Access," filed Mar. 1, 2007, which is hereby incorporated herein by reference in its entirety.

If the requested unit of memory is represented in TLB0, then processing returns to the interpretation unit, STEP 506, and the instruction is executed using the designation obtained from TLB0. However, if the requested unit of memory is not represented in TLB0, then further processing is performed.

For instance, architected access permissions (e.g., z-access permissions) are checked, STEP 508. This includes, in one embodiment, checking one or more indicators within an access control block. In one example, an access control block is associated with each predefined unit of memory (e.g., each 4 k byte block of storage) that is available in the configuration and provides certain parameters for the unit of memory. The access control block is stored in shared memory and is accessible by the processors coupled to the shared memory.

Figure 6:
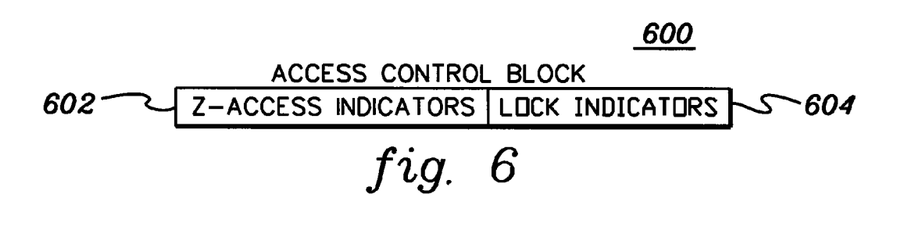
FIG. 6 depicts one example of an access control block used in accordance with an aspect of the present invention.

In one example, an access control block 600 (FIG. 6) includes the following fields:

a) Z-access indicators 602: These are indicators provided as part of the z/Architecture® that control access to a unit of memory. As examples, they include:

1) Access Control Indicator (ACC): If a reference is subject to key control protection, the access control indicator is matched with an access key when information is stored, or when information is fetched from a location that is protected against fetching;

2) Fetch Protection Indicator (F): If a reference is subject to key control protection, the fetch protection indicator controls whether the key control protection applies to fetch type references. For instance, one value indicates that only store-type references are monitored and that fetching with any access key is permitted; and another value indicates that key control protection applies to both fetching and storing.

3) Reference Indicator (R): The reference indicator normally is set to a particular value (e.g., 1) each time a location in the corresponding unit of memory is referred to either for storing or for fetching of information.

4) Change Indicator (C): The change indicator is set to a particular value (e.g., 1) each time information is stored at a location in the corresponding unit of memory.

b) Lock indicators 604: These indicators are included in the existing control block, in accordance with an aspect of the present invention, to facilitate determining whether the unit of memory represented by this control block is locked by one or more other processors. As an example, lock indicators 604 include:

1) Read Indicator (R): In accordance with an aspect of the present invention, a plurality of read indicators is provided, one for each processor of the environment. This indicator indicates whether the particular processor has a read lock for the particular unit of memory;

2) Write Indicators (W): In accordance with an aspect of the present invention, a plurality of write indicators is provided, one indicator for each processor of the environment. This indicator indicates whether that processor has a write lock on the unit of memory.

Returning to FIG. 5, if a check of the z-access permissions is unsuccessful, INQUIRY 510, then an architected exception is taken, STEP 511, and processing ends. However, if the checks are successful, then the processor (e.g., emulated CPU process) attempts to obtain a lock for the unit of memory, STEP 512.

For instance, the processor checks the lock indicators of the access control block and if the indicators specify that no one holds a lock for this unit of memory that is inconsistent with the requested lock, then the processor locks the unit of memory by updating the appropriate indicator(s). As an example, if the processor requests an exclusive write lock, the processor checks the access control block. In response to the access control block indicating that no processor has read or write access to the requested unit of memory, the requested unit of memory is locked by the requesting processor. This includes setting the appropriate write and read indicators in the access control block to indicate that this processor now has a write lock on that unit of memory. This is an exclusive lock, in this example.

In another example, if the requesting processor is requesting read access, then the processor checks the access control block to ensure no other processor (e.g., emulated CPU process) has write access. If no processor has write access, then the unit of memory is locked by the requesting processor. This is a shared lock, in one example, so multiple processors may have read access.

If the lock is obtained or if the processor already had the lock, INQUIRY 514, then the unit of memory is added to TLB0, in one example, if desired, STEP 515. Further, processing returns to the interpretation unit and the instruction is executed, STEP 506.

Returning to INQUIRY 514, if the lock is not obtained, then a determination is made as to whether the requesting processor has received a request for a unit of memory held by this processor, INQUIRY 516. If so, then the requesting processor nullifies the instruction, STEP 518. That is, the processor proceeds through a free phase, freeing any units of memory that it holds. Therefore, the requesting processor will have to restart the instruction, since it will appear that the instruction has not been executed at all. This avoids a potential deadlock situation.

If, however, there is no request for a unit of memory held by this processor, the requesting processor sends a request for the unit of memory to one or more other processors holding locks for that unit of memory, STEP 517. For instance, assume that the requesting processor is requesting write access to the unit of memory. It checks the access control block to determine which processors have read or write access to the unit of memory being requested. In response to obtaining this information, the requesting processor contacts each processor that has read or write access. In one example, this includes sending an asynchronous interrupt to each of the processors indicating that it would like access to the unit of memory. The asynchronous interrupt is not an architected interrupt, but a pseudo-interrupt; however, its processing is similar to that of an architected interrupt. Further details regarding processing the interrupt are described with reference to FIG. 7.

In accordance with an aspect of the present invention, when asynchronous interrupt handler 428 (FIGS. 4B and 7) receives an interrupt 700 (FIG. 7), a determination is made as to the type of interrupt, STEP 702. For instance, a field in emulated memory is periodically checked to determine if an interrupt is pending, and if so, the type of interrupt (e.g., there is a bit for each available type of interrupt). As one example, a determination is made as to whether the received interrupt is a pseudo-interrupt 704. If it is a pseudo-interrupt, a further determination is made as to the type of pseudo-interrupt: request for lock release 706, other pseudo-interrupt 708, etc. Should it be a request for lock release, then the pseudo-interrupt is handled by releasing the requested lock.

Figure 7:
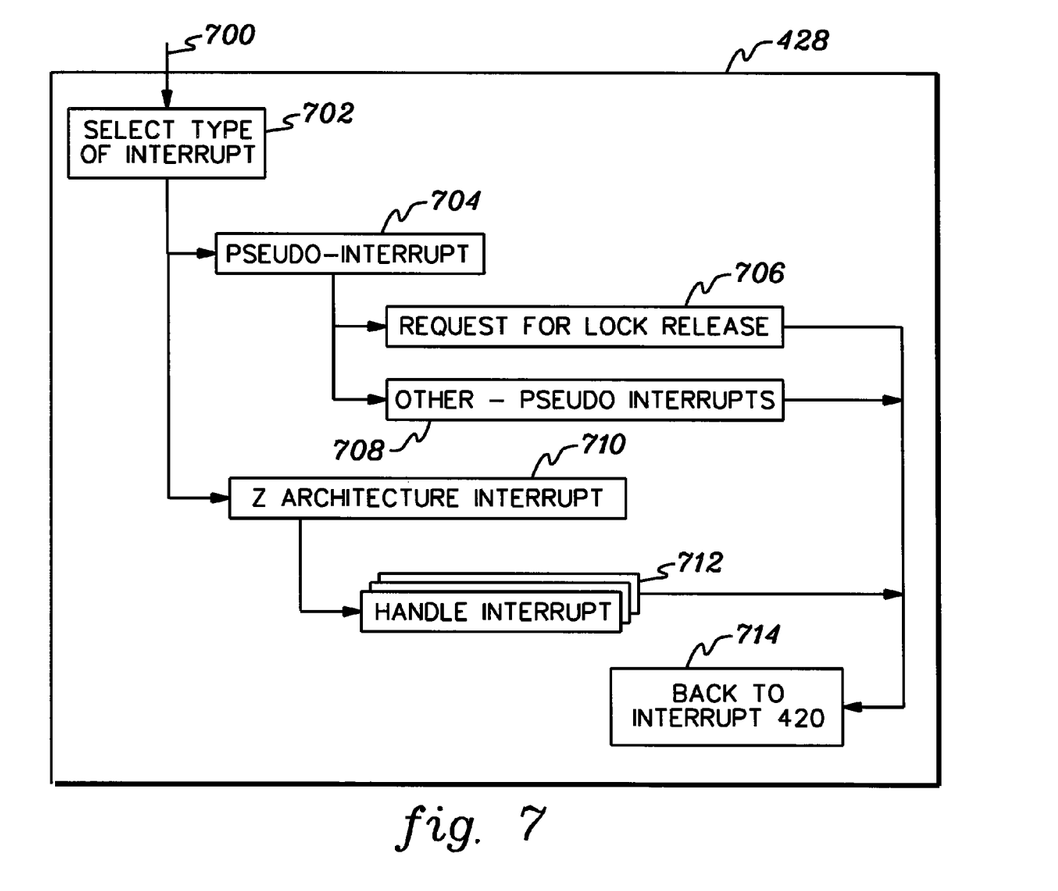
FIG. 7 depicts one embodiment of the logic associated with invoking an interrupt handler in obtaining a lock, in accordance with an aspect of the present invention.

If the interrupt is not a pseudo-interrupt, it is determined which type of z-architected interrupt 710 it is, and the appropriate handler 712 is invoked. Subsequent to handling the interrupt, processing continues with interpretation unit 420, STEP 714.

Returning to FIG. 5, subsequent to sending the request, STEP 517, processing continues with STEP 512. In one example, STEP 517 is only executed once within the loop. If the request has been sent, but the lock is still not obtained, the processor simply waits until the locks are relinquished or until it receives a request and needs to nullify.

Figure 8:
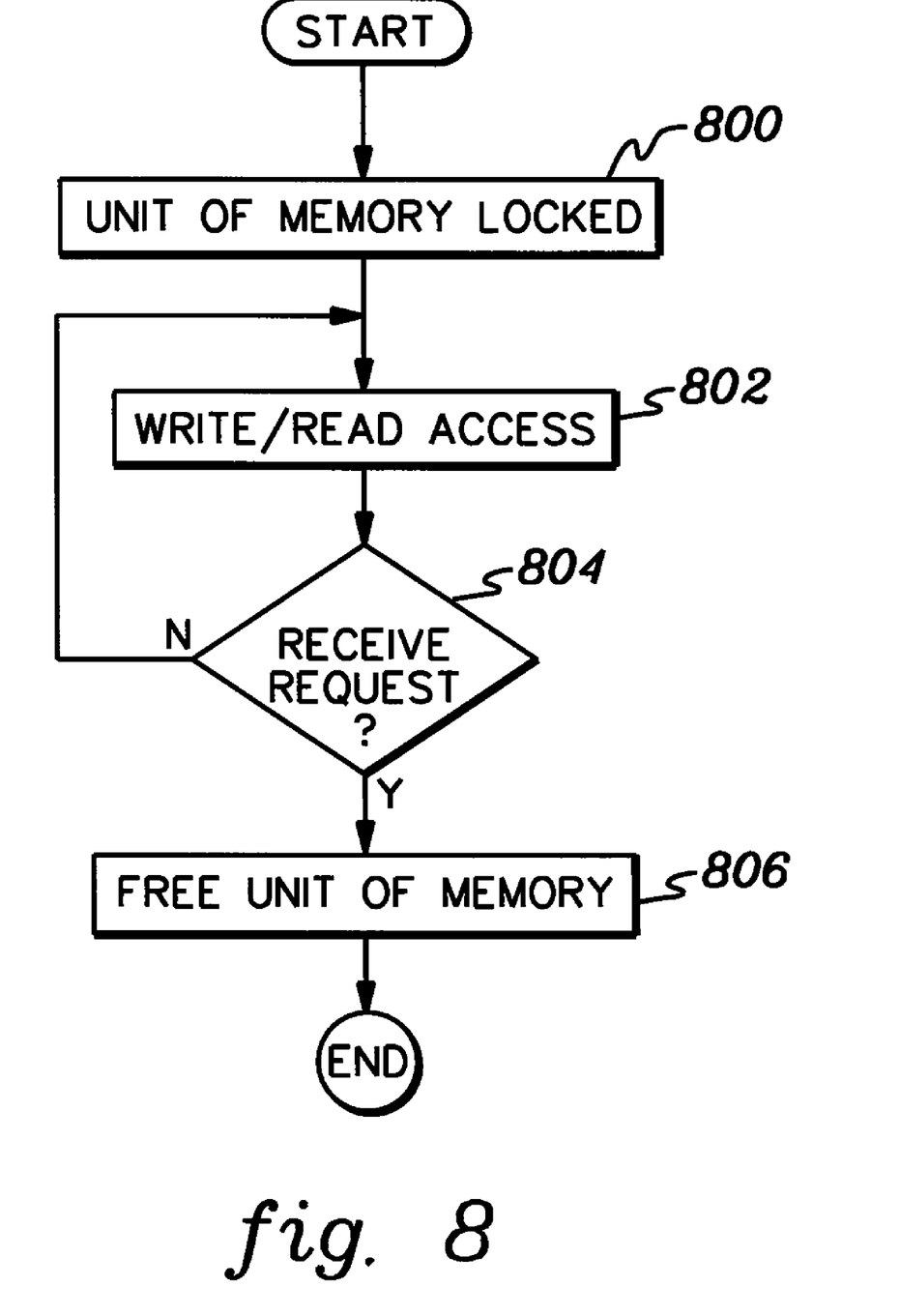
FIG. 8 depicts one embodiment of the logic associated with accessing a locked unit of memory, in accordance with an aspect of the present invention.

While the unit of memory is locked via a write lock, the locking processor can perform read or write accesses against that unit of memory, and the processor is not bothered unless and until another processor requests access to the unit of memory. This is described further with reference to FIG. 8. As shown, the unit of memory is locked, STEP 800. Thus, the processor has read and write access to that unit of memory, STEP 802. If the processor does not receive a request for that unit of memory, INQUIRY 804, the processor may continue to have write and read access to that unit of memory. If, however, the processor receives a request for that particular unit of memory, the processor frees or demotes the lock on that unit of memory, STEP 806, so that another processor can have read or write access.

In one embodiment, a determination may be made to free all the locked units of memory at strategic points in time, such as when a checkpoint is taken or when an asynchronous interrupt is received. However, in other embodiments, this does not occur. Instead, units of memory are freed upon request.

Described in detail above is a capability for providing memory consistency using page locking and enhanced architected features. In one example, a processor that is architected having a weak memory consistency emulates a firm memory consistency and is able to efficiently provide memory access having a firm memory consistency. This is accomplished without requiring synchronization instructions during the memory access and without using hardware to provide the memory consistency. It is further accomplished without causing deadlocks.

With such a memory consistent environment, a processor can assume that if it observes a store in memory, then any other previous stores have completed. Further, for instructions that access on an interval boundary (e.g., ½ word, word, double word, etc.), it is guaranteed that the entire interval is fetched or stored block concurrent.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 9:
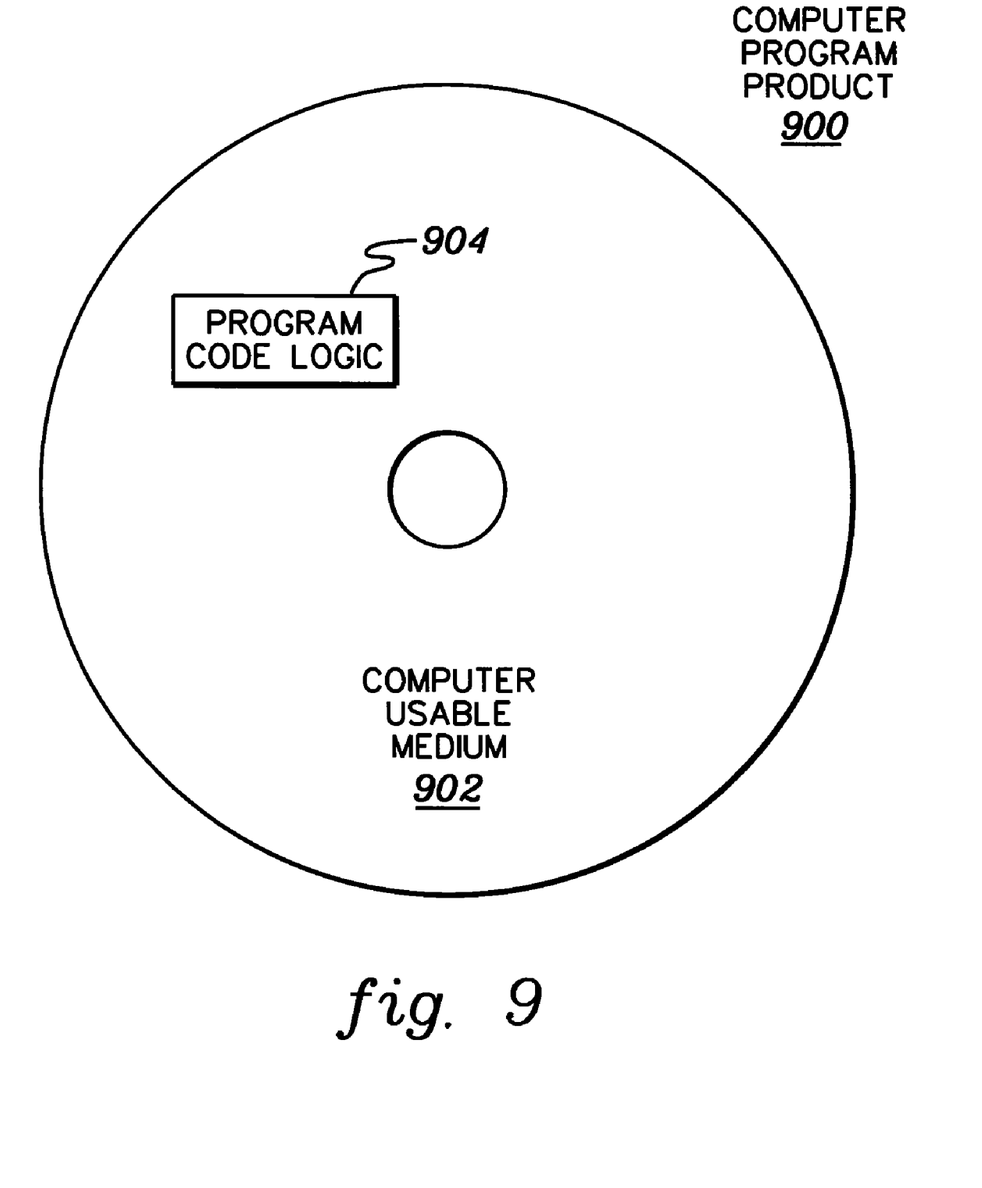
FIG. 9 depicts one embodiment of a computer program product to incorporate one or more aspects of the present invention.

One example of an article of manufacture or a computer program product incorporating one or more aspects of the present invention is described with reference to FIG. 9. A computer program product 900 includes, for instance, one or more computer usable media 902 to store computer readable program code means or logic 904 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided in which memory consistency is achieved using page locking. A processor architected to have a weak memory consistency emulates a firm memory consistency such that memory access is provided that has memory consistency. This is provided without requiring special hardware or special synchronization instructions. This enhances system performance and provides an efficient mechanism for achieving memory consistency. Further, by nullifying an instruction or unit of operation, in response to a request that occurs while the processor is attempting access to a unit of memory, deadlock situations are avoided.

Moreover, advantageously, in the typical situation in which a unit of memory is not contested (e.g., no more than one CPU is trying to use that unit of memory), there is no degradation in system performance. There is no added checking or extra tests.

In one embodiment, this capability is provided for instructions issued by application programs rather than by the operating system.

Although various embodiments are described above, these are only examples. For instance, the processing environment can include processing units that are based on architectures other than Power4, PowerPC® or Intel®. Additionally, servers other than pSeries® servers can incorporate and use one or more aspects of the present invention. Further, the environment may include more than two native processors or just one native processor. Moreover, operating systems other than those mentioned herein can be used. Further, the processing environment can emulate environments other than the z/Architecture®. Yet further, the architected features may be those of other architectures. Additionally, various emulators can be used. Emulators are commercially available and offered by various companies. Additional details relating to emulation are described in *Virtual Machines: Versatile Platforms For Systems and Processes* (*The Morgan Kaufmann Series in Computer Architecture and Design*), Jim Smith and Ravi Nair, Jun. 3, 2005, which is hereby incorporated herein by reference in its entirety. Yet further, the processing environment need not include emulator code. Many other types of processing environments can incorporate and/or use one or more aspects of the present invention.

Even though in one embodiment, TLB0 is referenced, one or more aspects of the present invention can be used without checking TLB0. Further, a unit of memory can be any predefined size of memory, including, but not limited to, a page of memory.

Moreover, in one or more embodiments, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for managing memory access in an emulated processing environment, the computer program product comprising:
   a tangible storage medium readable by a processor and storing instructions for execution by the processor to perform a method comprising:
      requesting, by an emulated central processing unit (CPU) process executing on a processor, access to a unit of memory as part of a unit of operation, the processor having a weak memory consistency architecture; and
      managing, by the requesting emulated CPU process, access to the unit of memory, the managing emulating a firm memory consistency on the weak memory consistency architecture, wherein the firm memory consistency provides memory consistency in that units of memory being modified are not observable other than by the one or more processes modifying the units of memory, and wherein the managing comprises:
         attempting, by the requesting emulated CPU process, to obtain a lock for the unit of memory;
         responsive to the lock not being obtained, determining whether the requesting emulated CPU process has received a request for access to a given unit of memory held by the requesting emulated CPU process; and
         responsive to the requesting emulated CPU process receiving the request for access to the given unit of memory held by the requesting emulated CPU process, nullifying by the requesting emulated CPU process the unit of operation to avoid a deadlock;
      wherein the nullifying comprises terminating the unit of operation absent a sending of an access request for the unit of memory to one or more emulated CPU processes holding the lock for the unit of memory and further comprising freeing locks held by the requesting emulated CPU process.

2. The computer program product of claim 1, wherein the nullifying enables the managing access to the unit of memory to be performed absent use of serialization instructions.

3. The computer program product of claim 1, wherein the method further comprises restarting the unit of operation, responsive to the nullifying.

4. The computer program product of claim 1, wherein the unit of memory comprises a page of memory.

5. A computer program product for managing memory access in an emulated processing environment, the computer program product comprising:
   a tangible storage medium readable by a processor and storing instructions for execution by the processor to perform a method comprising:
      requesting, by an emulated CPU process executing on a processor having a weak memory consistency architecture, access to a unit of memory; and
      managing, by the emulated CPU process, access to that unit of memory using an access mechanism, the managing forcing a firm memory consistency preventing other emulated CPU processes from observing the unit of memory responsive to it being modified, said managing comprising at least one of:
         employing one or more memory access tests to determine whether the unit of the memory is accessible, the one or more memory access tests including tests added to an existing architected access control block that includes an indication of which emulated CPU processes, if any, have read or write access to the unit of memory, and obtaining access to the requested unit of memory, in response to the employing indicating availability of the unit of memory; and
         determining that the unit of memory is being held by another emulated CPU process and is inaccessible to the emulated CPU process at this time, and invoking an interrupt handler to request that the another emulated CPU process relinquish one or more rights held for the unit of memory to allow the emulated CPU process to obtain access to the unit of memory, wherein in response to receiving the request to relinquish, the another emulated CPU process relinquishes the one or more rights, and the emulated CPU process obtains a lock for the unit of memory, in response to the relinquishing.

6. The computer program product of claim 5, wherein the obtaining access to the requested unit of memory comprises obtaining a lock for the unit of memory.

7. The computer program product of claim 6, wherein the obtaining the lock comprises setting one or more indicators in the access control block associated with the unit of memory, said setting depending on whether the requested access is a write access or a read access.

8. The computer program product of claim 7, wherein the access control block includes a plurality of read indicators indicating which, if any, emulated CPU processes have read access to the unit of memory, a plurality of write indicators specifying which, if any, emulated CPU processes have write access to the unit of memory and one or more architected access permissions to control access to the unit of memory.

9. The computer program product of claim 5, wherein the determining that the unit of memory is being held comprises checking one or more indicators in the access control block.

10. The computer program product of claim 5, wherein the request to relinquish one or more rights includes a request to free a lock on the unit of memory held by the another emulated CPU process or demote the lock on the unit of memory, depending on whether the requested access is a write access or a read access.

11. The computer program product of claim 5, wherein the interrupt handler provides an asynchronous interrupt to the another emulated CPU process to have the another emulated CPU process relinquish the one or more rights.

12. A computer system for managing memory access in an emulated processing environment, said computer system comprising:

a memory; and a processor in communications with the memory, wherein the computer system is configured to perform a method comprising:

requesting, by an emulated central processing unit (CPU) process executing on a processor, access to a unit of memory as part of a unit of operation, the processor having a weak memory consistency architecture; and managing, by the requesting emulated CPU process, access to the unit of memory, the managing emulating a firm memory consistency on the weak memory consistency architecture, wherein the firm memory consistency provides memory consistency in that units of memory being modified are not observable other than by the one or more processes modifying the units of memory, and wherein the managing comprises:

attempting, by the requesting emulated CPU process, to obtain a lock for the unit of memory;

responsive to the lock not being obtained, determining whether the requesting emulated CPU process has received a request for access to a given unit of memory held by the requesting emulated CPU process; and responsive to the requesting emulated CPU process receiving the request for access to the given unit of memory held by the requesting emulated CPU process, nullifying by the requesting emulated CPU process the unit of operation to avoid a deadlock;

wherein the nullifying comprises terminating the unit of operation absent a sending of an access request for the unit of memory to one or more emulated CPU processes holding the lock for the unit of memory and further comprising freeing locks held by the requesting emulated CPU process.

13. The computer system of claim 12, wherein the nullifying enables the managing access to the unit of memory to be performed absent use of serialization instructions.

14. The computer system of claim 12, wherein the method further comprises restarting the unit of operation, in response to the nullifying.

15. The computer system of claim 12, wherein the unit of memory comprises a page of memory.

16. A method of managing memory access in an emulated processing environment, said method comprising:

requesting, by an emulated central processing unit (CPU) process executing on a processor, access to a unit of memory as part of a unit of operation, the processor having a weak memory consistency architecture; and managing, by the requesting emulated CPU process, access to the unit of memory, the managing emulating a firm memory consistency on the weak memory consistency architecture, wherein the firm memory consistency provides memory consistency in that units of memory being modified are not observable other than by the one or more processes modifying the units of memory, and wherein the managing comprises:

attempting, by the requesting emulated CPU process, to obtain a lock for the unit of memory;

responsive to the lock not being obtained, determining whether the requesting emulated CPU process has received a request for access to a given unit of memory held by the requesting emulated CPU process; and responsive to the requesting emulated CPU process receiving the request for access to the given unit of memory held by the requesting emulated CPU process, nullifying by the requesting emulated CPU process the unit of operation to avoid a deadlock;

wherein the nullifying comprises terminating the unit of operation absent a sending of an access request for the unit of memory to one or more emulated CPU processes holding the lock for the unit of memory and further comprising freeing locks held by the requesting emulated CPU process.

17. The method of claim 16, wherein the nullifying enables the managing access to the unit of memory to be performed absent use of serialization instructions.

18. The method of claim 16, wherein the method further comprises restarting the unit of operation, in response to the nullifying.

19. The method of claim 16, wherein the unit of memory comprises a page of memory.

* * * * *